(12) United States Patent  (10) Patent No.: US 8,696,205 B2
Tavecchio                        (45) Date of Patent:     Apr. 15, 2014

(54) SLIDING BEARING FOR STRUCTURAL ENGINEERING AND MATERIALS THEREFOR

(75) Inventor: Charlotte Tavecchio, Costa Masnaga LC (IT)

(73) Assignee: CVI Engineering S.R.L. (IT)

( * ) Notice: Subject to any disclaimer, the term of this patent is extended or adjusted under 35 U.S.C. 154(b) by 504 days.

(21) Appl. No.: 12/669,104

(22) PCT Filed: Jul. 14, 2008

(86) PCT No.: PCT/EP2008/059157
§ 371 (c)(1),
(2), (4) Date: Feb. 19, 2010

(87) PCT Pub. No.: WO2009/010487
PCT Pub. Date: Jan. 22, 2009

(65) Prior Publication Data
US 2010/0195942 A1   Aug. 5, 2010

(30) Foreign Application Priority Data
Jul. 17, 2007 (IT) .................................. MI07A1434

(51) Int. Cl.
*F16C 29/02* (2006.01)
*E04B 1/36* (2006.01)

(52) U.S. Cl.
USPC ............... 384/36; 384/42; 384/276; 384/284; 384/902

(58) Field of Classification Search
USPC ......... 384/2, 36, 42, 276, 279, 902, 282, 284, 384/625, 286, 291, 300, 907–908, 384/911–912; 428/650; 14/73.5
See application file for complete search history.

(56) References Cited

U.S. PATENT DOCUMENTS 2,680,259 A * 6/1954 Milk .............................. 14/73.5
3,252,905 A   5/1966 Schaeffer
(Continued)

FOREIGN PATENT DOCUMENTS

CH      641254 A  *  2/1984
DE      2109332      9/1971
(Continued)

OTHER PUBLICATIONS

Datenblatt zu Sustaglide, Rochling High Performance Plastics, Stand 5, 2011.

(Continued)

*Primary Examiner* — Marcus Charles
(74) *Attorney, Agent, or Firm* — Lucas & Mercanti, LLP

(57) ABSTRACT

A sliding bearing for structural engineering applications, in particular for civil works such as bridges, buildings, structures that are required at the same time to withstand vertical loads and to allow relative movements and/or rotations, and structures to be protected against seismic events, said bearing having a low friction coefficient and being suitable for being used in severe operating conditions, both due to the loads applied and to particularly high operating temperatures. The bearing, which is of the type comprising a first part (2) connected to a supporting structure (P), a second part (3) connected to an element (G) to be supported by the supporting structure (P) and means suitable for allowing said second part (3) to translate and/or rotate with respect to said first part (2), the means comprising plates (4) and/or strips of a low-friction polymer material, is characterized in that the low-friction material is a polyamide.

8 Claims, 2 Drawing Sheets

(56) References Cited

U.S. PATENT DOCUMENTS

| | | | |
|---|---|---|---|
| 3,329,472 A | 7/1967 | Donnellan et al. | |
| 3,390,854 A * | 7/1968 | Sherburne | 248/55 |
| 3,397,016 A | 8/1968 | Delforce et al. | |
| 3,398,998 A * | 8/1968 | Burnett | 384/2 |
| 3,728,752 A * | 4/1973 | Andra et al. | 384/286 |
| 3,908,038 A | 9/1975 | Nienart et al. | |
| 3,971,598 A * | 7/1976 | Rudge | 384/36 |
| 3,995,915 A * | 12/1976 | Koster et al. | 384/36 |
| 4,006,505 A * | 2/1977 | Koster et al. | 14/73.5 |
| 4,217,324 A | 8/1980 | Meek | |
| 4,259,759 A | 4/1981 | Tada | |
| 4,320,549 A * | 3/1982 | Greb | 384/905.1 |
| 5,304,422 A | 4/1994 | Tanabe et al. | |
| 5,597,239 A * | 1/1997 | Scaramuzza et al. | 384/36 |
| 5,867,951 A * | 2/1999 | Yaguchi et al. | 52/167.4 |
| 6,126,136 A * | 10/2000 | Yen et al. | 384/2 |
| 6,467,961 B2 * | 10/2002 | Nakamaru et al. | 384/13 |
| 6,569,816 B2 | 5/2003 | Oohira et al. | |
| 6,752,065 B2 * | 6/2004 | Sugioka et al. | 92/12.2 |
| 6,783,869 B2 * | 8/2004 | Humer et al. | 428/650 |
| 6,905,246 B2 * | 6/2005 | Iwata et al. | 384/42 |
| 7,101,087 B2 * | 9/2006 | Hiramatsu et al. | 384/279 |
| 2003/0108765 A1 * | 6/2003 | Humer et al. | 384/912 |
| 2007/0230846 A1 * | 10/2007 | Tanaka et al. | 384/276 |
| 2008/0194437 A1 * | 8/2008 | Murase et al. | 508/108 |

FOREIGN PATENT DOCUMENTS

| | | | |
|---|---|---|---|
| DE | 24 61 325 B * | 4/1976 | |
| DE | 2608633 | 9/1976 | |
| DE | 4207246 | 9/1993 | |
| EP | 0338124 | 10/1989 | |
| EP | 1247901 | 10/2002 | |
| GB | 1356839 | 10/1920 | |
| GB | 1356839 A | 6/1974 | |
| GB | 2450215 A * | 12/2008 | |
| JP | 73034378 B * | 5/1973 | |
| JP | 08302832 A * | 11/1996 | |
| JP | 09177765 A * | 7/1997 | |
| JP | 2002236329 A * | 8/2002 | |
| JP | 2007016905 | 1/2007 | |
| JP | 2007016905 A | 1/2007 | |
| JP | 2008038038 A * | 2/2008 | |

OTHER PUBLICATIONS

EP Opposition dated Aug. 2, 2012.
Reply to EP opposition filed Mar. 15, 2013.

* cited by examiner

Sliding direction

SLIDING BEARING FOR STRUCTURAL ENGINEERING AND MATERIALS THEREFOR

This application is a national stage under 35 U.S.C. 371 of International Application No.: PCT/EP2008/059157, filed Jul. 14, 2008, which in turn claims priority under 35 U.S.C. §119 from Italian Application No.: MI2007A001434, filed Jul. 17, 2007.

The present invention relates to a sliding bearing for structural engineering applications, in particular for civil constructions such as bridges, buildings, structures that are required to simultaneously withstand vertical loads and to allow relative movements and/or rotations, and structures to be protected from seismic events, said bearing having a low friction coefficient and being suitable to be used in severe operating conditions, both due to the applied loads and to the high operating temperatures.

In the construction of civil structures, e.g. buildings and bridges, there are used structural bearing devices having the function of allowing relative movements, typically relative slidings or rotations, among two or more parts of the structure. In order to allow the above-mentioned movements, hinge- or slide-type constraints are provided in the structure.

The above-mentioned constraints generally comprise a pair of flat or curved surfaces suitable for sliding and/or rotating with respect to each other in order to allow relative movements and/or rotations. In order to minimize both static and dynamic friction among the parts, a first surface of the above-mentioned pair of surfaces is made of metal, for example an austenitic steel or an aluminum alloy or a hard chromium plated ferritic steel, whereas the other surface is conveniently made of a low-friction polymer. A lubricant between the sliding surfaces is commonly used to further reduce the friction among the parts.

According to the state of the art, the low-friction polymer that is mainly used for manufacturing sliding bearings is polytetrafluoroethylene (PTFE). This material has been in use in this type of applications for over 40 years and the accumulated expertise has allowed to completely define its performances and limits. These performances and limits have been coded into the standards of the technical field, among which e.g. the European standard EN 1337-2 "Structural bearings—Part 2: Sliding elements" and the technical specifications for constructions of the American Association of State Highway and Transportation Officials (AASHTO).

Through a suitable combination of the properties of the materials of the two surfaces and of the possible lubricant, the pair of surfaces of the sliding bearing has a low friction coefficient, both static and dynamic, a high wear resistance and a suitable resistance to the compression loads resulting from the dead load of the structure and the service actions.

Although the use of PTFE in the field of civil engineering is now consolidated from over four decades, many inefficiencies of the material are known mainly due to the poor wear resistance and to the excessive reduction of the compressive strength characterizing PTFE when temperature increases.

The above-mentioned reduction of the compressive strength of PTFE occurs through a creep phenomenon known in scientific literature as "cold flow". This phenomenon consists in a continuous creep of the polymer, which is extruded and laterally comes out from the sliding bearing thus producing a continuous reduction of the height of the surface element made of PTFE.

This phenomenon is further enhanced in the presence of high temperatures; the extent of the cold flow is in fact related to combinations of high values of compression load and operating temperature.

The expression "bearing operating temperature" means the temperature reached by the sliding surfaces. This operating temperature is considered high if it is comprised between 30° C. and 100° C.

Considering the low values of the friction coefficient shown by PTFE, the above-mentioned polymer has been always considered the ideal sliding material for manufacturing sliding bearings and therefore the technique has been developed in order to adapt the use of PTFE to various operating conditions. Within this technology development, reference technical standards have been coded which establish, on the basis of the operating temperature, limits to the values of the maximum pressure applicable to a PTFE surface in a sliding bearing. For example, European standard EN 1337-2 makes it compulsory for bearings exposed to a maximum operating temperature higher than 30° C. to consider a 2% reduction per degree above 30° C. of the characteristic value of the compressive strength of PTFE with respect to the value of the above-mentioned characteristic strength measured at a temperature of 30° C.

However, this criterion is disadvantageous from an economic point of view, since it results in an increase in the size of the sliding bearing and the related costs.

Further proof that PTFE is inadequate for the use at high operating temperatures is the fact that European standards of the EN 1337 series limit the field of use of sliding bearings incorporating one or more PTFE surfaces to a maximum operating temperature equal to 48° C. Beyond this temperature different types of structural bearings must be used, having higher costs and poorer performances in terms of friction coefficient. In practice these different structural bearings are roller bearings and rocker bearings, which are particularly expensive and partially lose the initial efficiency since they are completely made of metal and subject to atmospheric agents, whereby in the absence of a proper and expensive maintenance the friction coefficient reaches values much higher than those of the sliding bearings.

As a consequence of the increasing development of industry and infrastructures in countries that are in climatic regions characterized by higher average temperatures than the temperatures of Western European and North American regions, this inefficiency in the performances of PTFE at high operating temperatures represents a very important penalization from the point of view of costs and design. During the last years in fact many failures of structural bearings have been noticed caused by an excessive cold flow of PTFE. The economic impact of such failures has been remarkable and comprises both irreversible damages to civil structures and costs related to the replacement of the bearings.

However, in general the cold flow phenomenon is penalizing not only for all those civil engineering applications located in climatic regions characterized by high environmental temperatures, but also for those applications wherein the surfaces of the sliding bearings are subject to high sliding velocities, such as for example the sliding velocities caused by seismic events or by intense traffic conditions, or by traffic of high-speed railways.

In order to satisfy the need for applications at high operating temperatures, the use of technopolymers based on fiber-filled PTFE has been suggested. If compared to non-filled PTFE, these technopolymers have a higher compressive strength, but sliding bearings having a surface made of the above-mentioned technopolymers have a friction coefficient that is disadvantageously higher and a wear resistance that is lower than sliding bearings having a surface made of non-filled PTFE.

The use of ultra-high-molecular-weight polyethylene (UHMWPE) has also been recently suggested as a polymer alternative to PTFE in the manufacturing of sliding bearings for structural engineering applications, mainly due to its higher characteristics of wear resistance. However, also the above-mentioned material is characterized by a rapid decay of its mechanical strength at high operating temperatures and by performances that prevent it from being used at temperatures higher than 48° C.

The purpose of the present invention is to overcome the above-mentioned drawbacks by providing a sliding bearing according to claim 1, which can be used for structural engineering applications, in particular for civil constructions such as bridges, buildings, structures that are required to simultaneously withstand vertical loads and to allow relative movements and/or rotations, and structures to be protected from seismic events, of the type comprising a first part connected to a supporting structure, a second part connected to an element to be supported by said supporting structure and means for allowing a relative translation and/or rotation of said second part with respect to said first part, said means comprising a low-friction polymer material, characterized in that said low-friction material is a polyamide.

The use of polyamide as a low-friction material in sliding bearings for structural engineering is already known in the art.

Patent GB 1356839 describes, for example, a bearing for use in a bridge or other large structure in which one part is movable relative to a fixed part. The bearing has locating means secured in the fixed part on which is slidably mounted an intermediate member which can move towards and away from the fixed part. Cushioning means are arranged between the fixed part and the intermediate member and a bearer member is attached to the movable part so as to be slidable relative to the intermediate member. A layer of low-friction material is arranged between the intermediate and bearer members. The low-friction material can be a polyamide or another material sufficiently strong to resist compression and having a low coefficient of friction.

The use of polyamide as a low-friction material is also known from patent publications JP 2007016905 A U.S. Pat. No. 4,259,759 A U.S. Pat. No. 3,397,016 A and U.S. Pat. No. 3,329,472A. However, the above-mentioned documents describe the use of polyamide as a generic alternative to PTFE among a number of other materials and do neither mention the problem of the loss of performance of the low-friction material occurring when a sliding bearing operates at high temperatures nor consider the relationships between the behaviour of a sliding bearing and the operating temperature.

As it is known in the art, polyamide has a high compressive strength both at ambient temperature and at high temperature with a negligible cold flow, and provides performances that are well beyond the performances that can be provided by the materials for sliding bearings presently known and employed in structural engineering.

Through a number of tests with different materials carried out by the inventors, it has been noticed that polyamide has the required characteristics for the use in sliding bearings for structural applications, in particular for sliding bearings for applications at high operating temperature.

The experimental tests have proved that polyamide also meets the other requirements, such as a low friction coefficient, a high wear resistance, the maximum admissible sliding velocity, as well as the maximum admissible sliding path, and that these properties are comparable to the requirements for PTFE established by European standard EN 1337-2 and are better than the properties provided by technopolymers made of fiber-filled PTFE.

In order to further improve the resistance at high temperatures, in particular up to 170° C., the polyamide used in the bearing invention may be advantageously contains additives such as solid-state lubricants and may be cross-linked. The cross-linking process may be carried out chemically or by subjecting the polyamide to a radiating treatment with gamma rays or accelerated electrons at high radiation doses.

The cross-linking process results in a further increase in the maximum operating temperature, mechanical strength and modulus of elasticity, surface hardness and wear resistance and also in the dimensional stability of the material at high temperatures and in a reduction of the cold flow phenomenon.

A bearing made with the above-mentioned material has performances that are remarkably higher in the different service conditions with respect to prior art sliding bearings, in particular in the presence of high operating temperatures and high compression loads.

In summary, the features of a bearing according to the invention are:
- a low friction coefficient;
- a wear resistance and maximum sliding velocities that can be compared to those provided by PTFE, as established by the technical standards concerning sliding bearings for structural bearings;
- a higher compressive strength with respect to PTFE, as established by the technical standards concerning sliding bearings for structural bearings, in the presence of high operating temperatures, allowing in particular the use of the above-mentioned material at operating temperatures up to at least 100° C., which limit can be raised to 170° C. by carrying out a cross-linking treatment on the polyamide.

Further advantages and features of the sliding bearing for applications in structural engineering also characterized by high operating temperatures according to the present invention, will become clear from the following detailed description of two preferred embodiments given as non-limiting examples.

The description will be made with reference to the attached drawings, wherein.

Figure 1A:
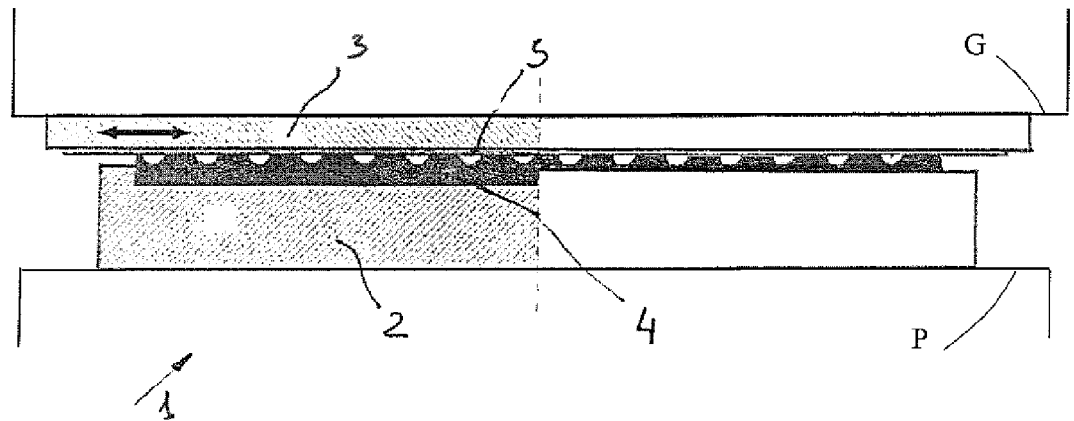
FIGS. 1a, 1b show two embodiments of the bearing according to the invention.
Figure 1B:
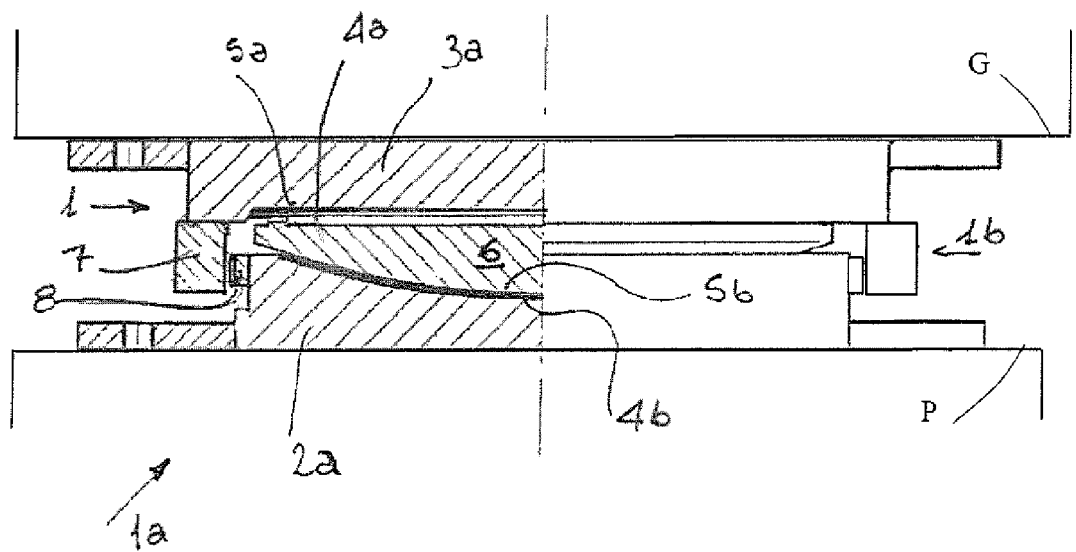

Referring to FIGS. 1a, 1b, reference number 1 indicates a sliding bearing of a flat type and reference number 1a indicates a bearing comprising both a flat-type sliding bearing 1 and a spherical-type sliding bearing 1b according to the invention. Both sliding bearings are characterized by a low friction coefficient and a high loading capacity and are suitable for high operating temperatures.

The flat-type sliding bearing 1 according to the invention, whose structure is identical to the structure of prior art sliding bearings, comprises a lower plate 2 suitable for being connected to a supporting structure, e.g. a pile P fixed to the ground, and an upper plate 3, e.g. connected to a bridge girder G. A plate 4 made of polyamide, as better described in the following, and a sheet-metal plate 5, e.g. made of austenitic steel or an aluminum alloy or a hard chromium plated ferritic steel, are inserted between the lower plate 2 and the upper plate 3.

Also the bearings 1 and 1b according to the invention, forming bearing 1a, have a structure that is identical to the structure of prior art bearings.

Bearing 1a comprises a lower plate 2a suitable for being connected to a supporting structure, e.g. a pile P fixed to the ground, and an upper plate 3a, e.g. connected to a bridge girder G. The top surface of the lower plate 2a is concave and has the shape of a spherical cap in order to interact with an intermediate plate 6 thus making a sliding bearing 1b of the spherical type. The top surface of the intermediate plate 6 is flat and interacts with the bottom surface of the upper plate 3a, thus forming with the latter a sliding bearing 1 for linear movements.

A plate 4a made of polyamide, as better described in the following, and a sheet-metal plate 5a, e.g. made of austenitic steel or an aluminum alloy or a hard chromium plated ferritic steel, are inserted between the intermediate plate 6 and the upper plate 3a. Similarly, a plate 4b made of polyamide, as better described in the following, and a sheet-metal plate 5b, e.g. made of austenitic steel or an aluminum alloy or a hard chromium plated ferritic steel, are inserted between the lower plate 2a and the intermediate plate 6. Alternatively to plate 5b, the intermediate plate 6 itself may be made of austenitic steel or an aluminum alloy or a hard chromium plated ferritic steel in the bottom part contacting the polyamide plate 4b.

In order to allow a translation in one direction only, bearings 1, 1a may be provided with guides 7 fixed to the upper plate 3, 3a that slide along strips 8 made of polyamide fixed to the lower plate 2, 2a.

The low-friction characteristics of a sliding bearing comprising polyamide may be improved by providing the surface of the above-mentioned polyamide with a plurality of lubrication dimples 9 (see FIG. 2) suitable to be filled with and to retain additional lubricants also when the surfaces are sliding.

Figure 2:
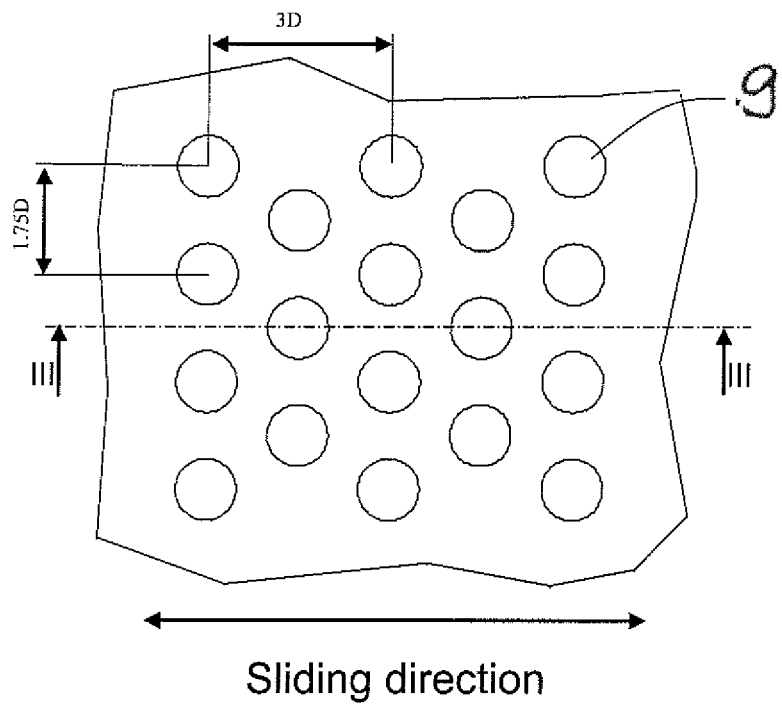
FIG. 2 shows a detail of a sliding surface made of polyamide.
Figure 3:
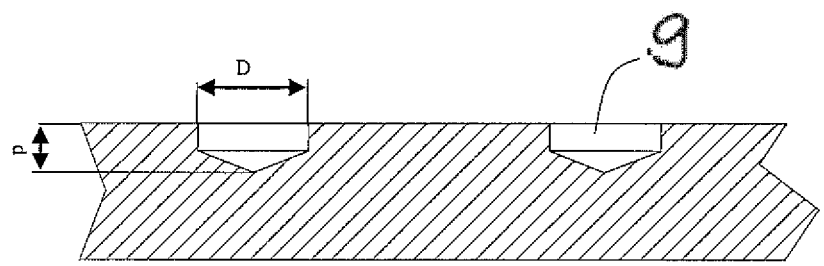
FIG. 3 shows a cross-section along line III-III of FIG. 2.

Through experimental tests it has been found that the circular design and the arrangement of dimples 9 shown in FIG. 2 allow to reduce the friction coefficient down to values that are close to the values that can be measured when using PTFE and to improve the wear resistance of the sliding bearing.

Defining D the diameter of dimples 9, the optimal arrangement of the dimples is according to two identical matrix patterns having a distance between the rows equal to about 1.75 D and a distance between the columns equal to 3 D, the matrix patterns being so arranged that each dimple is evenly spaced from the adjacent dimples.

An optimal value of 8 mm may be indicated for diameter D. The depth p of the dimples is not critical within the 2.5-3.5 mm range, the purpose being to contain a lubricant.

The polyamide plates 4, 4a, 4b have the following mechanical properties:
 a compressive strength higher than or equal to 200 MPa at 30° C., measured by means of a confined compression test;
 a compressive strength higher than or equal to 170 MPa at 48° C., measured by means of a confined compression test;
 a compressive strength higher than or equal to 100 MPa at 80° C., measured by means of a confined compression test;
 withstand a sliding path of at least 10000 m in the presence of said dimples 9 according to the arrangement of FIG. 2, wherein the dimples have been suitably filled with lubricant;
 withstand a sliding velocity of 50 mm/s in the presence of lubricant-filled dimples 9;
 have a dynamic friction coefficient lower than 1% at a temperature of 21° C.;
 meet the requirements concerning the static and dynamic friction coefficients established by European standard EN 1337-2 within the temperature range (−35° C.; 48° C.) prescribed to sliding bearings incorporating one or more PTFE surfaces;
 have a higher wear resistance than PTFE at high operating temperatures, in particular at temperatures higher than 48° C.

A suitable material for manufacturing these plates is a cast polyamide PA6, whose properties are set forth in Table 1.

TABLE 1

| Property | | Unit | Method |
|---|---|---|---|
| Specific gravity | 1.14 | $g/cm^3$ | EN ISO 1183-1 |
| Melting point | 215 | ° C. | ISO 11357 |
| Tensile yield stress | 75 | MPa | EN ISO 527 |
| Elongation at break | >35 | % | EN ISO 527 |
| Tensile strength modulus of elasticity | 3400 | MPa | EN ISO 527 |
| Hardness using a ball penetrating body | 170 | $N/mm^2$ | EN ISO 2039-1 |
| Shore Hardness | 81 | D Scale | DIN 53505 |
| Impact strength on a notched sample (Charpy) | >3.5 | $kJ/m^2$ | ISO 179/1eA/Pendel 1J |

In order to improve the low-friction characteristics, in particular at high operating temperatures, the above-mentioned polyamide contains additives in the form of solid-state lubricants, e.g. polyethylene, mixtures of fluoropolymers, molybdenum disulphide and calcium oxide.

Experimental tests have proved that the addition of a percentage of about 20% by weight of fluoropolymers results in a reduction of the wear by 50 times with respect to the base material.

In order to improve the compressive strength the above-mentioned polyamide may be added with filling materials such as e.g. glass and ceramic microspheres and glass fibers.

An example of this material made of a polyamide PA6 added with glass microspheres is the technopolymer whose characteristics are set forth in Table 2.

TABLE 2

| Property | | Unit | Method |
|---|---|---|---|
| Specific gravity | 1.18 | $g/cm^3$ | EN ISO 1183-1 |
| Melting point | 217 | ° C. | ISO 11357 |
| Tensile yield stress | 70 | MPa | EN ISO 527 |
| Elongation at break | >4 | % | EN ISO 527 |
| Tensile strength modulus of elasticity | 4000 | MPa | EN ISO 527 |
| Hardness using a ball penetrating body | 180 | $N/mm^2$ | EN ISO 2039-1 |
| Shore Hardness | 82 | D Scale | DIN 53505 |
| Impact strength on a notched sample (Charpy) | >2.5 | $kJ/m^2$ | ISO 179/1eA/Pendel 1J |

In order to further improve the resistance to high temperatures, thus reaching the operating temperature of 170° C., the above-mentioned polyamide PA6 may be cross-linked. According to the prior art, the cross-linking process may be carried out chemically or by radiating with gamma rays or accelerated electrons at high radiation doses, preferably comprised between 25 kGy and 500 kGy. In order to facilitate the above-mentioned cross-linking process by radiation, the polyamide PA6 may be added with cross-linking chemical agents and radical initiators. The radiating treatment may be preferably followed by a stabilizing heat treatment suitable for eliminating the presence of reactive free radicals.

In particular the cross-linking process carried out through a radiation treatment allows to increase the molecular weight of polyamide PA6 through the formation of intermolecular bonds that can modify the chemical/physical and mechanical properties of the polymer. The cross-linking process results in a further increase in the maximum operating temperature, that reaches 170° C., mechanical strength and modulus of elasticity, surface hardness and wear resistance and finally in an increase in the dimensional stability of the material at high temperatures with a reduction of the cold flow phenomenon.

In the case of radiation cross-linking is it advantageous to provide for the introduction of stabilizing and/or anti-oxidizing agents into the polymer during the compounding phase before the radiation treatment, so as to eliminate the free radicals produced by the radiation treatment using gamma or beta rays.

As it may be appreciated on the basis of the description above, the sliding bearing for structural engineering according to the present invention allows to extend the range of the operating temperatures up to 170° C., i.e. well beyond the limits of prior art sliding bearings.

Further advantages resulting from the use of polyamide as an low-friction material in sliding bearings comprise:
- a lower specific gravity, at least 50% lower, of the polyamide with respect to non-filled PTFE and to technopolymers made of fiber-filled PTFE;
- a lower industrial cost of polyamide with respect to non-filled PTFE and to technopolymers made of fiber-filled PTFE;
- a higher compressive strength with respect to PTFE at any temperature within the range of use, which allows to make sliding bearings characterized by a lower size and higher working pressures.

In summary, the above-mentioned advantages result in a substantial reduction of the costs with respect to conventional sliding bearings when the operating temperature does not exceed 48° C. and in the possibility of using sliding bearings up to 170° C., thus achieving highly remarkable economic benefits with respect to the expensive devices presently employed.

It is obvious that, in order to meet possible and specific needs, a man skilled in the art will be able to make numerous modifications and changes to the above-described sliding bearing and the related materials, all of which are within the scope of the invention as set forth in the following claims.

The invention claimed is:

1. A civil structure incorporating a sliding bearing for structural engineering applications at temperatures of 48° C. or higher, comprising:
   a supporting structure and an element to be supported by said supporting structure together forming said civil structure, wherein said civil structure is subjected to an applied vertical load;
   a first bearing part connected to said supporting structure;
   a second bearing part connected to said element to be supported by said supporting structure; and
   a means disposed intermediate said first and second bearing parts for allowing said second bearing part to slide relative to said first bearing part, said means comprising a plate made of a low-friction polymer material,
   wherein said low-friction polymer material is a polyamide, and wherein said polyamide is a cast polyamide 6 added with solid-state lubricants.

2. The civil structure of claim 1, wherein said solid-state lubricants are chosen among polyethylene, mixtures of fluoropolymers, calcium oxide and molybdenum disulphide.

3. The civil structure of claim 1, wherein said polyamide is a polyamide added with filling materials suitable for improving compressive strength of said polyamide.

4. The civil structure of claim 3, wherein said filling materials are chosen among glass and ceramic microspheres and glass fibers.

5. The civil structure of claim 1, wherein said polyamide is a cross-linked polyamide.

6. The civil structure of claim 1, wherein said polyamide plate comprises a plurality of dimples suitable for retaining a lubricant.

7. The civil structure of claim 6, wherein said dimples have a circular cross-section and are arranged according to two identical matrix patterns, said matrix patterns having a distance between rows of about 1.75 times a diameter of said dimples and a distance between the columns of about 3 times said diameter, said matrix patterns being so arranged that each dimple is evenly spaced from the adjacent dimples.

8. The civil structure of claim 7, wherein said diameter is equal to 8 mm.

* * * * *

UNITED STATES PATENT AND TRADEMARK OFFICE
CERTIFICATE OF CORRECTION

PATENT NO.       : 8,696,205 B2
APPLICATION NO.  : 12/669104
DATED            : April 15, 2014
INVENTOR(S)      : Charlotte Tavecchio It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 631 days.

Signed and Sealed this

Twenty-ninth Day of September, 2015

Michelle K. Lee
*Director of the United States Patent and Trademark Office*